United States Patent [19]

Sanville

[11] Patent Number: 4,817,666
[45] Date of Patent: Apr. 4, 1989

[54] FLUID FLOW CONTROL VALVES

[76] Inventor: Frank E. Sanville, 12 Southstoke Road, Bath BA2 5SJ, England

[21] Appl. No.: 57,770

[22] Filed: Jun. 4, 1987

[51] Int. Cl.[4] .................. F15B 13/044; F16K 7/18
[52] U.S. Cl. .................. 137/596.17; 91/443; 91/468; 137/110; 137/112; 137/119
[58] Field of Search .................. 91/443, 468; 137/110, 137/112, 119, 596.17

[56] References Cited

U.S. PATENT DOCUMENTS

| 2,778,373 | 1/1957 | Jaquith | 137/112 |
| 3,610,698 | 10/1971 | Gachot et al. | 137/112 X |
| 3,738,227 | 6/1973 | Bitzer et al. | 137/119 X |
| 3,835,751 | 9/1974 | Cowan | 91/443 X |
| 4,173,984 | 11/1979 | Solomon | 137/119 |

FOREIGN PATENT DOCUMENTS 443218  8/1975  U.S.S.R. .................. 137/112

Primary Examiner—Gerald A. Michalsky
Attorney, Agent, or Firm—Clifford A. Poff; Thomas H. Murray

[57] ABSTRACT

A fluid flow control valve in a fluid flow control circuit comprises a cavity, first, second and third ports open to the cavity, and a valve member for selectively closing the first port or the second port. The third port serves as an input for receiving fluid under pressure and the other two ports serve as to outputs for this fluid each extending to an associated outlet. A solenoid causes an armature to rotate about a lining so that a lever on the armature is arranged for selectively opening and closing the outlets to close the output associated with this outlet. The valve member is responsive to pressure drop at one or other of the outlets to close the output associated with this outlet. Downstream of the valve there are ducts extend from between the input and each of the outlets for supplying fluid received from the input.

5 Claims, 2 Drawing Sheets

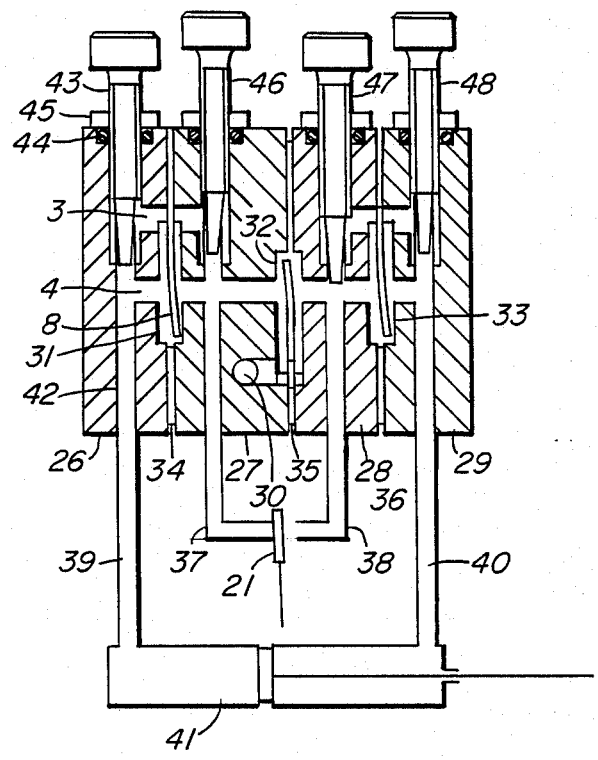

FLUID FLOW CONTROL VALVES

Valves of the types used by the fluid power industry to effect fluid flow control are complicated in construction and require high quality in the production processes.

According to the present invention there is provided a fluid flow control valve comprising a cavity, at least three ports open to the cavity, and a valve member for selectively closing one or other of two of the ports; the valve member being a flexible sheet in which there is a tongue that is in the cavity and that is anchored with respect to the cavity along one edge only and that is otherwise free to move within the cavity for closing said one or said other of said two of the ports, the sheet being provided with a perforated zone through which the third and any further port is permanently open to the cavity. This valve is of extremely simple construction. The valve is in a fluid flow control circuit, the third port of the valve serving as an input for receiving fluid under pressure, said one and said other of said two ports of the valve serving as two outputs for this fluid each extending to an associated outlet, and there being means for selectively opening and closing the outlets; the valve member being responsive to pressure drop at one or other of the outlets, brought about by operation of said opening and closing means to open one or other of the outlets, to close the output that has the opened outlet associated with it; and there being a supply extending from between the input and one or other of the outlets, downstream of the valve member, for supplying, when this outlet is closed, fluid received from the input. In this circuit basic valve functions are implemented using simple components.

For a better understanding of the invention and to show how it may be applied, reference is made to the accompanying drawings where some reference numbers are repeated when a feature is duplicated or appears in more than one Figure.

FIG. 7 shows a compact arrangement of three of the said valves in which one valve is in a directional control circuit and each of the other two valves is in a differential restrictor network.

Figure 1:
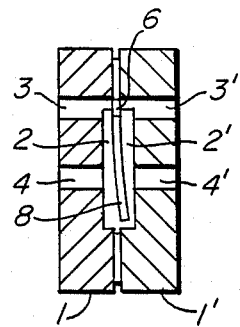
FIG. 1 shows a valve.
Figure 2:
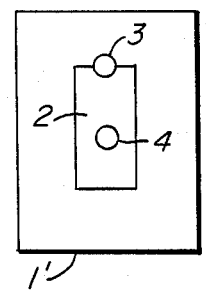
FIG. 2 shows the mating face of a body member of the said valve.
Figure 3:
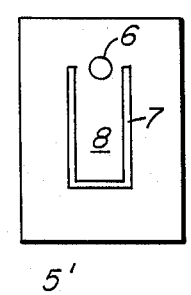
FIG. 3 shows a flexible foil component of the said valve.

FIG. 1 is a median section of the valve where 1 is one of two identical body members. A mating face, shown in FIG. 2, is provided with a recess 2 arranged so that when the two body members are assembled the recesses 2 and 2' form a single cavity. One end of the recess 2 is provided with a first connecting port 3 and the middle of the recess 2 is provided with a second connecting port 4. Two body members 1 and 1' are assembled by clamping them together using suitable fastenings, not shown, with a sheet that is a flexible foil 5 between them. Flexible foil 5, shown in FIG. 3, is formed with a through hole 6 and a U shaped slot 7 leaving a tongue 8. When foil 5 is assembled with body members 1 and 1' hole 6 aligns with ports 3 and 3' and tongue 8 is free to flex within the cavity formed by recesses 2 and 2' but it cannot move in any other way because it is clamped by the body members 1 and 1' along a line between the ends of slot 7 and including hole 6. By this means tongue 8 is free to bend about the said line. The outer region of foil 5 forms a sealing gasket between body members 1 and 1'

Figure 4:
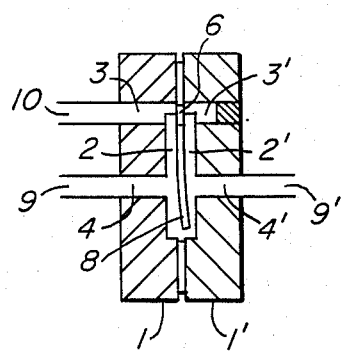
FIG. 4 shows the said valve arranged as a shuttle valve.

FIG. 4 shows a median section through a shuttle valve. Inlets ducts 9 and 9' are connected to ports 4 and 4' and outlet duct 10 is connected to port 3. Port 3' is covered over or blocked, alternatively a second outlet duct may be connected to port 3'. When fluid under pressure is directed into duct 9, difference in pressure between recesses 2 and 2' forces the tongue 8 to move towards port 4' and to block it. Fluid entering the valve by duct 9 leaves through port 3 and outlet duct 10. Similarly fluid under pressure in duct 9' causes the tongue 8 to block port 4 and fluid flows from duct 9' through to outlet duct 10. Alternatively, and as described in more detail below with reference to, for example FIG. 6, the duct 10 can be an inlet duct and the ducts 9 and 9' can be outlet ducts.

Figure 5:
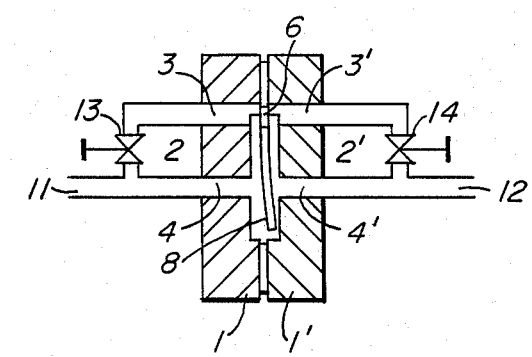
FIG. 5 shows the said valve arranged as part of a differential restrictor network.

FIG. 5 is a median section of a valve connected with variable restrictors in a differential restrictor network. Ports 4 and 4' are connected respectively to ducts 11 and 12. Duct 11 is also connected by means of a T junction through a variable restrictor 13 to port 3 and duct 12 is similarly connected through variable restrictor 14 to port 3'. When there is fluid under pressure in duct 11, port 4 and recess 2, tongue 8 is moved to block port 4', that is it closes a by-pass of the variable restrictor that is downstream of the tongue 8, and fluid has to flow through duct 11, port 4, recess 2, port 3' to the restrictor 14 and then into duct 12. The rate of flow is adjustable by means of variable restrictor 14. Similarly when flow goes in the other sense, that is when there is fluid under pressure in duct 12, the flow path is through port 4', recess 2', port 3, restrictor 13 to duct 11. Flow rate in this mode is adjustable by means of variable restrictor 13.

Figure 6:
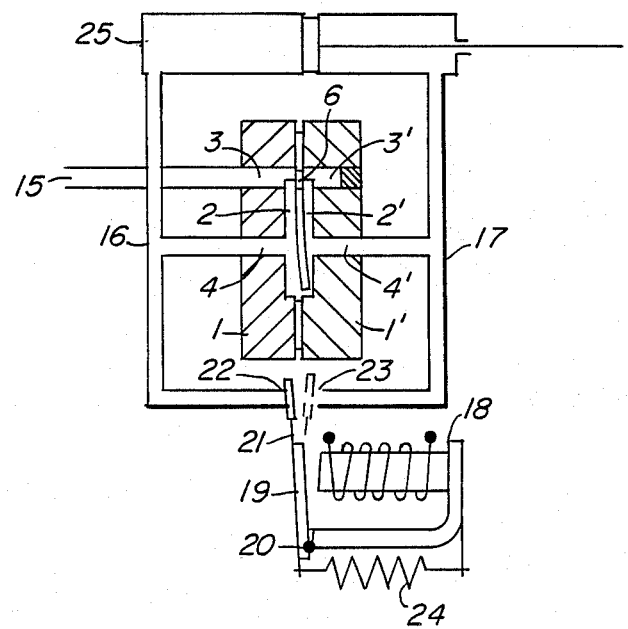
FIG. 6 shows the said valve in a directional control circuit.

FIG. 6 is a median section of a valve in a directional control circuit. Duct 15 connects a source of fluid at high pressure to port 3. Port 3' is blocked or covered; alternatively port 3' may be connected to a continuation through the valve of supply duct 15. Ports 4 and 4' are connected through T junctions to ducts 16 and 17 respectively. One end of each of ducts 16 and 17 terminates in a region of low pressure with a mechanism for differentially blocking the ends of the said ducts. One such mechanism is shown by way of example in FIG. 6. An electrically driven solenoid 18 causes an armature 19 to rotate about hinge 20. An extension lever 21 mounted on armature 19 is arranged so as to block the outlet 22 or duct 16 under the influence of spring 24 as shown in full lines in FIG. 6. When the solenoid 18 is energised armature 19 and lever 21 move to the position shown with dashed lines and block outlet 23 of duct 17. The other ends of ducts 16 and 17 are connected to any device or devices for which directional control is appropriate. A double acting actuator 25 is shown in a symbolic way in FIG. 6 by way of example. When the lever 21 is in the first state duct 16 is blocked and initially fluid under high pressure flows from port 3 through recess 2', port 4' and duct 17 to the low pressure region at the duct outlet 23. Flow through recess 2' produces a lowering of pressure on that side of the foil causing the tongue 8 to move towards and block port 4' whereafter this condition is stable as long as the lever 21 remains in the first state. Fluid from duct 15 flows through recess 2, port 4, and duct 16 to the head end of actuator 25 causing the piston rod to move outwards. Displaced fluid from the rod end of actuator 25 flows through duct 17 and outlet 23. When solenoid 18 is energised lever 21 moves so as to block outlet 23 and open outlet 22; this is the second state. Initially flow out of recess 2 through port 4 and duct 16 causes tongue 8 to move towards and to block port 4. Thereafter high pressure fluid flows out of port 4' into duct 17 and into the rod end of actuator 25 causing the piston rod to retract. Displaced fluid from the head end of actuator 25 leaves through duct 16 and outlet 22. This state is stable as long as solenoid 18 is energised.

FIG. 7 is a median section through an arrangement in which three valves are enclosed in one assembly with one valve in a directional control circuit and each of the other two valves in a differential restrictor network. There are four body members 26, 27, 28 and 29. 26 and 29 are similar also 27 and 28 are similar except that body member 27 has provision for connecting to a source of high pressure fluid through duct 30, here shown in cross-section. Recesses in the mounting faces of each body member cooperate to form cavities 31, 32 and 33. Body elements are assembled and clamped with fastenings not shown with flexible foils 34, 35 and 36 between them arranged so that the tongues of the foils (FIG. 3) are free to flex inside the respective cavities and holes 6 are aligned on the ports at the ends of the cavities. Body members 27 and 28 with foil 35 are in the directional control circuit. Ducts 37 and 38 connect body members 27 and 28 to a differential blocking device here represented by way of example by lever 21. Body members 26 and 27 with foil 34 and body members 28 and 29 with foil 36 are in two differential restrictor networks. All four body members 26, 27, 28 and 29 are formed with through passages to provide for internal variable restrictors, each in the same manner. Passage 42 is formed in body member 26 to connect ports 3 and 4 and the upper half is internally screwed to engage a cooperating valve spindle 43. A seal 45 retained by cap 44 ensures that fluid does not leak. The end of valve spindle 43 is profiled so that the restriction to flow between ports 3 and 4 is adjustable by variably engaging spindle 43 in body 26. Body members 26 and 29 are connected to an appropriate driven device such as the actuator 41 by ducts 39 and 40 respectively.

If duct 37 is blocked for example by lever 21 in the first position, initially fluid flows from duct 30 through cavity 32 to the low pressure region at the open duct 38. The tongue of foil 35 moves to block this path and thereafter fluid flows from duct 30 via cavity 32 and the restrictor network including the foil 34 in the cavity 31 and the two valve spindles 46 and 43 (which serve as variable restrictors for this network) to pass out through duct 39 to actuator 41. Within the restrictor network 31/34/43/46 the fluid pressure causes the tongue of the foil 34 to block direct flow by-passing the valve spindle 43, and flow takes place via cavity 31 and past valve spindle 43.

Displaced fluid from the rod end of 41 flows through duct 40 via the restrictor network including the foil 36 in the cavity 33 and the two valve spindles 48 and 47 (which serve as variable restrictors for this network) to pass out through duct 38. Within the restrictor network 33/36/47/48 flow is past the valve spindle 47 and via the cavity 33.

In the second state of lever 21, after change-over of the tongue of foil 35, fluid flows from cavity 32 via the restrictor network 33/36/47/48 (through cavity 33 and past valve spindle 48) to duct 40 and the rod end of the actuator 41 and the piston rod retracts. At the same time fluid from the head end of actuator 41 flows through duct 39 and via the restrictor network 31/34/43/46 (through cavity 31 and past valve spindle 46) to duct 37 and the low pressure region.

I claim:

1. A fluid flow control valve in a fluid flow control circuit, the valve comprising a cavity, first, second and third ports open to the cavity, and a valve member for selectively closing the first or the second of the ports;

the valve member being a flexible sheet in which there is a tongue that is in the cavity and that is anchored with respect to the cavity along one edge only and that is otherwise fee to move within the cavity for closing the first or the second port;

the sheet being provided with a perforated zone through which the third port is permanently open to the cavity;

the third port of the valve serving as an input for receiving fluid under pressure, the first and the second ports serving as two outputs for this fluid each extending to an associated outlet, and there being means for selectively opening and closing the outlets;

the valve member being responsive to pressure drop at one or other of the outlets, brought about by operation of the outlets, to close the output that has the opened outlet associated with it; and there being a supply extending from between the input and one of the outlets, downstream of the valve member, for supplying, when this outlet is closed, fluid received from the input.

2. A valve in a fluid flow control circuit as claimed in claim 1, wherein said supply is a first supply, and wherein there is a second supply extending from between the input and the other of the outlets, this second supply supplying, when this other outlet is closed, fluid received from the input.

3. A valve in a fluid flow control circuit as claimed in claim 1, wherein the means for selectively opening and closing the outlets comprises a solenoid-operated valve member that closes one or other of the outlets.

4. A valve in a fluid flow control circuit as claimed in claim 1, wherein the supply includes a restriction network whereby fluid flow rate in the supply can be varied.

5. A valve in a fluid flow control circuit as claimed in claim 1, wherein the supply includes a restrictor network whereby fluid flow rate in the supply can be varied, this restrictor network comprising two variable restrictors and a further valve disposed therebetween, the further valve being a fluid flow control valve that comprises a cavity, first, second and third ports open to this cavity, and a valve member for selectively closing the first or the second of these ports, this valve member being a flexible sheet in which there is a tongue that is in the cavity of this valve and that is anchored with respect to this cavity along one edge only and that is otherwise fee to move within this cavity for closing the first or the second port of this valve, this sheet being provided with a perforated zone through which the third port of this valve is permanently open to the cavity of this valve; this further valve being responsive to pressure of fluid applied to the network to close a by-pass of the variable restrictor that is downstream of this further valve with respect to this fluid supply, thereby to ensure fluid flow through this downstream variable restrictor.

\* \* \* \* \*